United States Patent Office 3,511,741

Patented May 12, 1970

1

3,511,741

FABRICATABLE METAL LAMINATE COMPOSITE

Gerald Brent Elder, Stamford, Conn., assignor to American Cyanamid Company, Stamford, Conn., a corporation of Maine No Drawing. Continuation-in-part of application Ser. No. 480,781, Aug. 18, 1965. This application May 16, 1966, Ser. No. 550,133

Int. Cl. D03d 3/00

U.S. Cl. 161—73 2 Claims

ABSTRACT OF THE DISCLOSURE

A mechanical vibration dampening laminate comprising two metal layers bonded with a non-foamed polyurethane having a dynamic glass transition temperature of not more than about the temperature at which the structure is to be used and having a metal screen embedded in the polyurethane which acts as a stress-raising member.

This application is a continuation-in-part of my copending application Ser. No. 480,781, filed Aug. 18, 1965, now abandoned.

This invention relates to metal laminates. More particularly, this invention relates to metal laminates composed of an elastomeric adhesive having a metal layer on at least one planar surface thereof, said adhesive having embedded therein a woven, stress-raising member. Still more particularly, this invention relates to metal laminates, preferably composed of two metal sheets bonded together with a rubbery adhesive which has a woven stress-raising member embedded therein.

Metal laminates are known in the art and have been the subject of numerous patents. Most laminates are satisfactory for many commercial uses but fail in at least one of three important categories which are essential for commercial use, i.e. sound damping, lightweight and formability. That is to say, most commercial metal laminates do not sufficiently damp mechanical vibration as to allow their usage in, for example, kitchen cabinets, electronic relay chassis, instrument cabinets, base plates for motors, and the like. Additionally, when they are made into such articles as doors, etc. they are generally too heavy and have too low a strength to weight ratio to be practical. Additionally, many commercial metal laminates fail because of their inability to be formed into various shapes without delaminating, i.e. the laminate fails when being deep drawn, welded, etc. into the configuration desired by the ultimate consumer. Therefore, it becomes more commercially practical to utilize other forms of construction.

I have now found that metal to metal laminates can be prepared without the accompanying undesirable features of other laminates mentioned above. To be more specific my laminates may be formed into intricate shapes such as 90° bends, 180° bends, Pittsburg Lock seams and Pexto elbow edges, etc. They may be fabricated, joined and post-formed by spot welding, seam welding, soldering, punching, riveting, tapping, etc. using conventional equipment.

Furthermore, they may be bent, deep drawn, joined, sawed and worked without delaminating, much in the same manner as solid sheet metal. Additionally, my novel laminates have unique vibration damping properties and in some cases increased thermal insulation behavior as compared to readily available commercial laminates. They also have a greater strength to weight ratio than solid core metal laminates.

It is therefore an object of the present invention to provide metal laminates.

2

It is a further object of the present invention to provide metal laminates composed of a rubbery adhesive having a metal layer bonded to at least one of its surfaces, said adhesive having a woven stress-raising member embedded therein.

It is still a further object of the present invention to provide metal laminates preferably composed of two metal layers bonded together with a rubbery adhesive which has a woven stress-raising member embedded therein.

These and other objects of the present invention will become more apparent to one skilled in the art upon reading the more detailed description set forth hereinbelow.

My novel laminates, as mentioned briefly above, are composed of (1) a metal layer bonded to (2) a film of rubbery adhesive which has a woven stress-raising member embedded therein. My laminates can provide, in economical fashion, products which have a favorable aesthetic appearance and also exhibit the desirable and necessary properties of non-laminated metal sheets.

British Pat. No. 951,266 teaches a typical commercially available metal laminate over which my laminates are an improvement. The laminates of said patent are also composed of two or more metal layers bonded with an adhesive. There is present therein, however, a sheet of flexible polymeric resin which is adhered to each sheet of metal. It is this polymeric sheet which provides the patented laminate with its structural properties.

My laminates do not contain such a polymeric sheet bonded to each metal layer. I can produce laminates which have properties at least equivalent to, and in most cases better than, those of the product shown in the British patent, without utilizing the extraneous sheet of polymer.

I achieve my excellent results by the unique combination of a metal layer and an adhesive layer which has a woven stress-raising member embedded therein. The use of the woven stress-raising member imparts a very high non-linear vibration damping to the resulting product.

More specifically, I have found that I can produce metal products, preferably laminates of at least two layers of metal, which dampen sound due to vibration, to the extent that the resulant laminate may be used for applications hereinbefore believed impossible.

In their basic form, my products are composed of one metal sheet which has bonded to it, the rubbery adhesive having embedded therein the woven stress-raising member, more fully described hereinbelow. More preferably, the adhesive containing the embedded woven stress-raising member has a metal sheet bonded to both horizontal planar sides thereof. In a more preferred embodiment, my laminates are composed of a core metal sheet which has laminated on or bonded to one or both surfaces thereof, a second metal sheet or layer. The core layer can be the same metal or a different metal than the surface layer. The core metal layer additionally, may be (a) solid, (b) perforated, i.e. possess an open area, (c) striated (embossed), i.e. grooved, etc. on its planar surface, or (d) folded.

If perforated cores are used, the perforations may be circular, oval, rectangular, square, diamond shaped, etc. or random shaped holes. The size of the perforation used depends upon the intended application. For example, if the laminate is to be used in architectural areas, it is preferred that the hole diameter be not greater than the thickness of the surface layer so that depressions of the surface metal into the holes will not form when bending pressure is applied to the laminate during forming, thereby marring too severely the appearance of the surface layer. On the other hand, if some aesthetic purpose due to the depressions is sought, larger holes or perforations are permissible.

While the particular sizes, shapes, etc. of the perforations in the base metal layer are not critical, the open area of the metal core can range from about 5% to about 95%, of the base metal. Optimum properties of the resultant laminates are achieved with base metals having open areas of from about 15% to about 75%.

The base core metal layer, as mentioned above, may alternatively be striated. The striations or embossings may be of any design or configuration with such designs as grooves, squares, diamonds, lines, pits and the like, being exemplary. No particular advantage or disadvantage, however, is obtained in the properties of the resultant laminate by the use of any specific design, other than a resultant decorative effect caused by the pressure consolidation of the laminate. That is to say, since the outer metal layer is generally thinner than the base or core layer, the pressure used in the consolidation technique causes the outer layer to be pressed into the striations on the base layer thereby causing a decorative design to be embossed onto the outer surface thereof.

The size of the striations used also generally depend upon the intended application and the exterior design desired. It is acceptable, however, to utilize embossed, indented, grooved, quilted, etc. channels having depths up to 75% of the thickness of the core layer, preferably 10% to 50%. The total striated area may range from about 5% to about 80%, preferably 15%–75% of the total surface area of the base or core metal. The width of the striations may vary from about 0.005 inch to about 1 inch, preferably 0.01 inch to about ¼ inch, and may all be equally or randomly placed.

The core layers may vary in thickness over a relatively large span. It is considered practical, however, to utilize a thickness ranging from about 5 to 1000 mils. The core layer, for most applications, should be at least about twice the thickness of as the foil, skin or surface metal layer, which, practically, with or without the core layer, should range in thickness from about 1–100 mils. Cores and skins of the same thickness may, however, be used.

Many types of metals may be utilized to produce my laminates with stainless steel as the thin layer and carbon steel or aluminum as the thicker base layer, being preferred. Other metals such as zinc, gold, galvanized carbon steel, aluminum coated carbon steel, magnesium, copper, brass, titanium, lead, nickel, silver, nickel alloys and the like may also be utilized as the top layer or core layer of my novel laminates without departing from the scope of the present invention. Double layers of each metal may also be used, e.g. aluminum on aluminum.

My novel laminates are useful in such applications as architectural devices such as mullions, window tracks, window frames, elevator doors and panels, etc. automotive parts, tractor and truck bodies, household structures such as kitchen panels, trim, closet doors, door frames and panels, bathroom panels, shower stalls and cabinets, furnace housings, garage doors, industrial articles such as ducts and exhaust hoods, corrosion resistant chambers, building panels, electronic equipment panels and chassis, instrument cabinets, wall plates, vending machines and the like. Military space applications are also within the realm of applications for my laminates.

As indicated above, the unique feature of the laminates of the instant invention resides in the adhesive layer which is used as a backing or bonding material for the metals mentioned above. These adhesives may consist of any rubbery or elastomeric material known to those in the art which has a dynamic glass transition temperature at or below the working temperature at which the laminate is to be ultimately used.

I have found that when such an adhesive is employed and has embedded therein a woven stress-raising member, the unique damping properties mentioned above are produced.

By the term "woven stress-raising member" as used herein and in the appended claims is meant any material or article of manufacture which is in the form of a fabric or network of cords, ribbons, wires, etc. that cross at regular intervals and may or may not be secured at the crossings, and which, when embedded in the adhesive, raises the local stress in the adhesive and distributes the stress through the adhesive layers. These members may be in the form of a braid, reticulation, mesh, net, sieve, screen, etc. and may be interlaced, intertwined, tangled or otherwise intertwisted.

I have found that the addition of the stress-raising member to the adhesive causes the adhesive to behave differently. While not wishing to be bound by any particular theory, it is believed that the following discussion will, at least, provide one explanation of this phenomenon.

Any sudden discontinuity in a stressed solid will induce stress concentration at that point. The stress concentration factor is dependent on the geometrical configuration of the discontinuity and may range from slightly more than one to a hundred or more.

In a viscoelastic material such as a rubbery adhesive, the energy required to strain the material at low stresses is almost completely recoverable when the stress is removed, i.e. there is no damping of the motion. At higher stress levels, the energy is no longer recoverable and is dissipated in the material, i.e. there is damping.

Discontinuities, such as wires or screens, etc. provided by the woven member, in the adhesive layer of a metal laminate, increase the local stress in the adhesive layer. This places more of the low level stresses, recoverable without this layer, into the non-recoverable or damping region. At higher amplitudes, the wires etc. distribute the stress over a wide area and stress the adhesive into the damping region. The overall result is a broad range damping metal laminate.

The stress-raising members used herein may be linear or random in configuration. They may contain individual, attached or non-attached, parallel, straight or bent members or attached or non-attached, perpendicular, straight or bent members, having the same or a different number of members per inch on each side thereof. The woven members may contain from 1 to 1000 strands, preferably 3–100, to the inch and may differ in number of strands in either direction.

The stress-raising members may be composed of any material, with such materials as metals, natural or synthetic polymers, i.e. poly(vinylidene chloride), poly(acrylonitrile), poly(methyl methacrylate), etc. neoprene-coated paper, glass, asbestos, paper, polymer-coated fiberglass, and the like being exemplary. As mentioned above, they may be used in the form of wire, wire mesh, screening, cloth, and the like.

The thickness of the woven stress-raising member is not critical and is governed primarily by the thickness of the adhesive layer which may vary from about .1 mil to about 1 inch, preferably, from about .5 mil to ½ inch, the woven member being somewhat thinner than the adhesive layer so that it is embedded herein.

A further restriction on the instant invention is that both the woven stress-raising member and the bonded metal layers should be ductile and flexible.

Any adhesive which is rubbery and has the appropriate dynamic glass transition temperature, as mentioned above, may be used.

Examples of applicable adhesives include polyvinylacetates, and vinyl acetate copolymers, polysulfides and epoxy-polysulfide mixtures, butyl rubber-based adhesives, silicone-based rubbery resins, rubber modified polyethylene/propylene rubbers, and the like. Further examples of useful adhesives include those disclosed and claimed in one or more of the following U.S. patents: Nos. 2,610,910, 2,400,612, 2,514,427, 2,581,920, 2,673,845, 2,684,351, 2,879,252, 2,918,442, 2,920,990, 2,977,273, which patents are hereby incorporated herein by reference.

A preferred group of adhesives useful herein are the polyurethane-based adhesives, i.e. those adhesives produced by so modifying polyurethane resins so as to create adhesive properties therein. Such adhesives are well known in the art and further discussion thereof herein is not deemed to be necessary.

A more preferred group of adhesives are those specifically set forth and claimed in at least one of the following pending U.S. patent application: Ser. No. 274,911, filed Apr. 23, 1963, now abandoned; Ser. No. 296,916, filed July 23, 1963, now abandoned; Ser. No. 380,914, filed July 7, 1964, now abandoned, and which applications are hereby incorporated herein by reference.

Briefly, these adhesives are composed of the following ingredients:

(A) a polyurethane resin,
(B) a diamine curing agent, and
(C) a glycidyl ester or ether
(D) as a substitute for, or in addition to (C), an aminosilane,
(E) as a substitute for (D), and in addition to (C), an epoxy silane or
(F) in addition to components (A), (B), (C) and (E), a polyethylenically unsaturated compound.

Although generally any known polyurethane may be used, the polyether based resins, i.e. those produced from polyalkylene ether, thioether or ether-thioether glycols which have been reacted with a suitable isocyanate compound and those prepared from linear polyesters containing a plurality of isocyanate-reactive hydroxyl groups, such as those produced by condensing a polyhydric alcohol with a polycarboxylic acid or anhydride, are preferred. U.S. Pat. No. 2,729,618 teach examples of various polyurethanes which may be used as components in the resins used herein and also procedures for the production thereof, said patents being incorporated herein by reference.

glycidyl benzyl acrylamide, the diglycidyl ether of 2,2-bis(p-hydroxyphenyl) propane and other aryl or alkyl glycidyl esters or ethers known in the art. Resinous glycidyl esters, including dimers and trimers etc. of monomeric epoxy compounds, as well as such materials as e.g. epoxidized polyesters, i.e. those resins produced by the epoxidation of unsaturated polyester resins, e.g. those specified above, and epoxidized polyolefins containing extensive unsaturation as are produced by the polymerization of a polyunsaturated olefin such as butadiene or isoprene either alone or in admixture with minor proportions of monoethylenically unsaturated monomers such as butene-1, ethylene, propylene, styrene, vinyl toluene, etc. These polydiolefins are liquid resins and are subjected to epoxidation with, for example, peracetic acid, to partially convert the olefinic unsaturation in the resin to epoxy groups, some of which are internal, e.g., positioned along the resin chain and others of which are terminal, e.g., positioned at the termination of branches formed by the incorporation of a diolefin such as butadiene into the resin chain through one of its double bond extending away from the resin chain. The epoxidation process generally is not carried to completion, leaving some unsaturation as a site for addition polymerization. The epoxidation process may also provide some hydroxyl functionality in the resultant resin.

These unsaturated epoxy resins are (1) liquid at 23° C., (2) have an iodine number of at least 100 and (3) have an epoxide equivalent weight in the range of from 100–300 (number of grams of resin containing 1 gram mole of epoxide). A particularly useful unsaturated epoxy resin, is a viscous, liquid, partially epoxidized polybutadiene having a viscosity of 1800 poises at 25° C., an epoxide equivalent weight of 177, 2.5%, by weight, of hydroxyl and an iodine number of 185.

The bisphenol-epichlorohydrin type of epoxy resins may also be used. For example, such resinous epoxy materials as those having the formula;

(I)

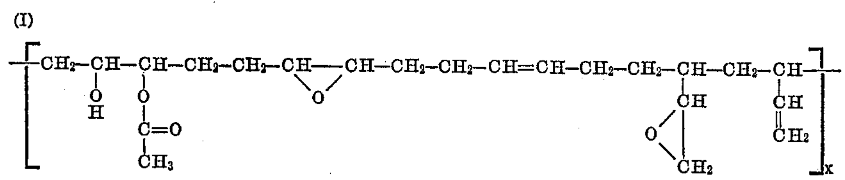

wherein X is at least 2, and those having the formula (II)

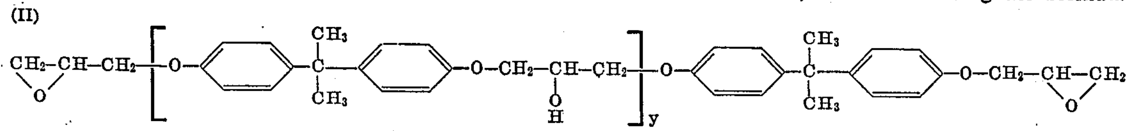

wherein $y$ is at least 1. These polymeric epoxides are well known in the art as are methods for their production. These glycidyl additives may be added, as such, in ratios of from about 1:2 parts to about 1:16 parts of the glycidyl ester or ether to the polyurethane, respectively, with amounts ranging from about 1:4 parts to 1:10 parts being preferred.

A polyurethane resin system which has been found to be exceptionally useful is composed of a polyester of adipic acid and ethylene glycol which has been reacted with methylene diphenylisocyanate. The resultant product is then further reacted with 1,4-butanediol. When polyurethane resins of this type are utilized, no curing agent need be employed.

The polyurethane may necessitate curing, however, in order to give the optimum results. If such curing is necessary, as determined by art recognized means, curing agents such as 4,4'-diamino-diphenyl-methane, 4,4'-methylene-bis-2-orthochloroaniline and the like may be used. Ranges of from 0%–200%, preferably 20%–160%, of the stoichiometric equivalent of the polyurethane resin, based on its isocyanate group (NCO) content, are satisfactory.

The glycidyl ethers or esters useful as components in these adhesives include diglycidyl esters, diglycidyl ethers, monoethylenically unsaturated monoglycidyl esters and ethers, examples of which include glycidyl methacrylate, glycidyl acrylate, allyl glycidyl ether, diglycidyl phthalate, In place of, or in conjunction with, the glycidyl esters and ethers, an aminosilane such as gamma-aminopropyltriethoxysilane, delta-aminobutyldiethoxy silane, gamma-aminopropyltripropoxysilane, gamma - aminopropylmethyldiethoxysilane, gamma-aminopropylethyldiethoxysilane, gamma-aminopropylphenyldiethoxysilane, delta-aminobutyltriethoxysilane, delta-aminobutylethyldiethoxysilane, delta - aminobutylphenyldiethoxysilane, gamma-aminobutylmethyldiethoxysilane, gamma - aminobutyltriethoxysilane and the like, in concentrations ranging from about 0.1% to about 4.0%, by weight, based on the weight of the polyurethane resin, may also be used.

Furthermore, if the glycidyl ester or ether is utilized, an epoxy silane, such as gamma-glycidoxypropyltrimethoxysilane, in amounts ranging from 0.1% to 10.0%, by weight, based on the total weight of the adhesive per se, may be used in addition thereto.

An additional component which may be used in combination with the polyurethane resin, the amine curing agent, the glyicdyl ester or ether and the epoxy silane, comprises a polyethylenically unsaturated compound such as tetrallyl melamine, trimethylolpropanetrimethacrylate, divinyl benzene, triallylphosphate, triallylamine, ethylene glycol dimethacrylate, diallylphthalate, 1,4-di(vinyloxy) butane and the like, in concentrations of up to about 20%, by weight, based on the total weight of the adhesive composition per se.

Before applying the adhesive to the metal, the metal should preferably be chemically clean. This may be achieved by working the metal with hot aqueous alkali or acid solution. The adhesive is preferably used as a 40–50% solution in a solvent (such as methyl ethyl ketone) and may be applied to the metal by brushing, roller coating, curtain coating or spraying techniques and the like.

The laminates of the instant invention are prepared by coating one or both sides of the metal layers to be bonded together with an adhesive, adding the woven stress-raising member, evaporating off the solvent, placing the metal layers together under pressure to form the laminate and curing the adhesive. The solvent in the adhesive may then be more fully evaporated off at 70–120° C. and the adhesive is then preferably cured at 110–160° C. for 2–3 minutes. With the polyurethane adhesives, the layers are pressed together at 50–100 p.s.i. and post-cured at 140–150° C. for 8–16 hours. The adhesives may also be utilized as solvent-free systems whereby no evaporation step is necessary before curing. My laminates can be produced both by a continuous method whereby rolls of metal are continually coated with adhesive and fed to evaporation (optional), curing and nipping zones or in a bulk method whereby the layers are individually coated with adhesive, such as by spraying, and subjected to heat and pressure consolidation.

The following examples are set forth for purposes of illustration only and are not to be construed as limitations on the instant invention except as set forth in the appended claims. All parts and percentages are by weight unless otherwise specified.

Example 1

Two 10 mil sheets of aluminum (½" x 9⅞") are each coated with 1 mil of a commercially available rubbery adhesive composed of 100 parts of a polychloroprene base and 85 parts of a p-t-amyl-phenol-formaldehyde resin in benzol (U.S. Pat. No. 2,610,910), having a dynamic glass transition temperature of 18° C. One of the coatings is embedded with ½" x 9" section of polyethylene woven screen, 1 mil thick, having 14 strands per inch. The coated side of the other sheet is then placed upon the coated side of the embedded sheet. The entire structure is then heated to 155° C. to cure the adhesive, cooled to room temperature and tested as follows:

The structure is clamped one inch from one end, deflected one inch at the free end and released. The time required for the vibrations to decay to 1/16" at the free end is then measured and recorded. The results of the test and the strength to weight ratio of the sample of Example 1 and other samples, produced according to Example 1, both exemplary and comparative, are set forth below in Tables I and II.

TABLE I

| Ex. | Sample | Adhesive—See Table I Code | Density (g./cm.³) | Modulus (p.s.i.×10⁶) | Offset Yield (0.2%) (p.s.i.×10³) | M/D | Y/D | Test Results, Seconds |
|---|---|---|---|---|---|---|---|---|
| 1 | 10 mil aluminum on 2 sides of adhesive-embedded polyethylene screen.* | (1) | 1.188 | 0.70 | 5.8 | 16.3 | 1.35 | 3.9 |
| 2 | do | (2) | 1.194 | 0.77 | 6.7 | 17.8 | 1.55 | 4.8 |
| 3 | 10 mil aluminum on 2 sides of adhesive-embedded stainless steel woven screen. | (2) | 2.316 | 4.10 | 40.3 | 56.2 | 1.01 | 2.4 |
| 4 | Solid aluminum sheet (comp.) 20 mil/thick | | 2.710 | 6.78 | 77.4 | 70.7 | 7.85 | 32.0 |
| 5 | Solid stainless steel (comp.) sheet, 25 mil/thick | | 7.950 | 15.20 | 86.5 | 53.8 | 3.00 | 35.2 |

Code for Table I:

(1) Same as that of Example 1.

(2) Adhesive produced from 3 parts of glycidyl methacrylate, 1 part of 3 3'-methylenebis-ortho-chloraniline and 0.35 part of gamma-glycidoxy-propyl-trimethoxysilane blended with 12 parts of a 90/60 ethyleneglycol/ propyleneglycol adipate based commercially available polyurethane resin and 0.01 part of 2.5-dimethyl-2.5-di(t-butylperoxy)hexane in methylethylketone; glass transition temperature of −36° C.

* Secured at crossings.

M=Modulus; D=Density; Y=Flexural Yield Strength.

TABLE II

| Ex. | Adhesive—See Code Table I | Sample | Test Results, Seconds |
|---|---|---|---|
| 6 | (1) | Laminate of perforated aluminum 53% open area, 40 mil thick; having 10 mil aluminum adhered to both sides; no stress-raiser added. | 19.15 |
| 7 | (1) | 10 mil aluminum adhered on both sides of adhesive-embedded polyvinyl chloride mesh*, ¼" square openings; 4 strands to the inch. | <0.5 |
| 8 | (2) | 10 mil aluminum on both sides of adhesive-embedded 20 ply cotton filter cloth, 100 strands to the inch. | 2.6 |
| 9 | (1) | Diamond patterned striated aluminum, 40 mil-both sides having 10 mil aluminum adhered thereto; polyvinylchloride cloth embedded in adhesive, 50 strands to the inch. | 2.9 |
| 10 | (1) | Diamond patterned striated aluminum, 40 mil-both sides having 10 mil aluminum adhered thereto; polyvinylchloride coated fiberglass embedded in adhesive, 20 strands to the inch. | 4.1 |
| 11 | (2) | Wire screen (10 strands to the inch) embedded in adhesive coated on one side of 20 mil lead sheet. | 3.2 |
| 12 | (2) | Perforated core, 37% open area; carbon steel, 40 mil; 10 mil copper coated on both sides; copper mesh wire, 1,000 strands to the inch, embedded in adhesive. | 3.9 |
| 13 | (1) | Same laminate as Ex. 6 except polyvinyl chloride coated fiberglass; 3 strands to the inch-embedded in adhesive. | <0.5 |
| 14 | A(2) | Same laminate as Ex. 11 except intertwisted hemp embedded in adhesive | 8.1 |
| 15 | Polyvinyl acetate-dynamic glass transition temperature, 10° C. | Same laminate as Ex. 8 except wire screen, 80 strands to the inch-embedded in adhesive | 4.7 |
| 16 | B | Same as Example 1 | 4.8 |
| 17 | C | Same as Example 3 | 4.9 |

* Secured at crossings.

A=Adipic acid-ethylene glycol-1, 4-butane diol polyester reacted with methylene diphenyl isocyanate as the polyurethane base—all other components equivalent to adhesive (2) of Table I.

B=Same as adhesive (2) except that the glycidyl methacrylate is replaced by a commercially available liquid, partially epoxidized polybutadiene having a viscosity of 1,800 poises at 25° C. an epoxide equivalent of 177 and an iodine number of 185.

C=Same as adhesive (2) except that the glycidyl methacrylate is, replaced by a commercially available resinous epoxide having a structure similar to Formula I, above, and a viscosity of 1,900 poises at 23° C. and an epoxide content of 9%.

I claim:

1. A metal structure comprising at least two metal layers bonded together with a non-foamed polyurethane resin-based adhesive having (1) a dynamic glass transition temperature of not more than about the temperature at which the structure is to be used and (2) embedded therein a metal screen which acts as a stress-raising member.

2. A metal structure according to claim 1 wherein at least one of said metal layers is striated.

References Cited

UNITED STATES PATENTS

| | | | |
|---|---|---|---|
| 1,770,521 | 7/1930 | Hayes | 181—33.1 |
| 2,196,615 | 4/1940 | Surprenant | 181—33.1 |
| 2,237,623 | 4/1941 | Ledwinka | 161—113 X |
| 2,326,581 | 8/1943 | Van Cleef | 181—33.1 |
| 2,728,702 | 12/1955 | Simon et al. | 156—79 |
| 2,776,101 | 1/1957 | McDermott | 248—24 |
| 3,002,868 | 10/1961 | Boivin | 181—33.1 |
| 3,056,707 | 10/1962 | Helbing et al. | 181—33.1 |
| 3,061,491 | 10/1962 | Sherrard et al. | 181—33.11 |
| 3,087,565 | 4/1963 | Kerwin | 181—33 |
| 3,097,124 | 7/1963 | Denenberg | 161—113 |

JOHN T. GOOLKASIAN, Primary Examiner

C. B. COSBY, Assistant Examiner

U.S. Cl. X.R.

161—74, 84, 89, 190, 213; 181—33; 248—21